(12) United States Patent
Hiscock (10) Patent No.: US 8,817,843 B2
(45) Date of Patent: Aug. 26, 2014

(54) CHIRP COMMUNICATIONS

(75) Inventor: Paul Dominic Hiscock, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 82 days.

(21) Appl. No.: 13/525,244

(22) Filed: Jun. 15, 2012

(65) Prior Publication Data

US 2012/0320950 A1   Dec. 20, 2012

(30) Foreign Application Priority Data

Jun. 17, 2011  (GB) .................................. 1110240.7

(51) Int. Cl.
   *H04B 1/00*         (2006.01)
(52) U.S. Cl.
   USPC ........................................... 375/139; 374/130
(58) Field of Classification Search
   USPC .................... 375/139, 130, 147; 342/160, 196
   See application file for complete search history.

(56) References Cited

U.S. PATENT DOCUMENTS

| 5,410,621 A * | 4/1995 | Hyatt ............................. 382/260 |
| 2008/0174475 A1* | 7/2008 | Clark ............................. 342/160 |
| 2011/0064119 A1* | 3/2011 | Sforza ............................ 375/139 |

FOREIGN PATENT DOCUMENTS

| WO | WO 96/26579 | 8/1996 |
| WO | WO 01/54432 | 7/2001 |
| WO | WO 2006/057930 | 6/2006 |

OTHER PUBLICATIONS

Yang, et al., "Comparative Study of Coherent, Non-Coherent, and Semi-Coherent Integration Schemes for GNSS Receivers", Proc. of 63rd Annual Meeting of the Inst. of Navigation, Apr. 23-25, 2007, Cambridge, MA, pp. 1-20.
Search Report issued Oct. 2, 2012 in GB 1110240.7.

* cited by examiner

*Primary Examiner* — Khai Tran
(74) *Attorney, Agent, or Firm* — Pillsbury Winthrop Shaw Pittman LLP (57) ABSTRACT

A method for receiving a chirp signal at a receiver, the chirp signal communicated over a link from a transmitter, the chirp signal comprising at least one symbol, each symbol comprising a plurality of identical chirps, each chirp encoding a symbol value, the method comprising: determining a measure indicative of error in the received chirp signal; determining the number of coherent integrations and non-coherent integrations to apply per symbol in dependence on the indicated error; for each symbol, coherently and non-coherently integrating the plurality of chirps in accordance with the determined numbers so as to form an integrated symbol; and for each symbol, decoding the symbol value from the integrated symbol.

14 Claims, 6 Drawing Sheets

CHIRP COMMUNICATIONS

CROSS-REFERENCE TO RELATED APPLICATIONS

The present application claims priority to GB 1110240.7 filed Jun. 17, 2011, the contents of which are incorporated herein by reference in its entirety.

FIELD OF THE INVENTION

The present disclosure relates to chirp communications, and in particular to receiving chirp communications at a receiver.

BACKGROUND OF THE INVENTION

The chirp modulation method is a modulation method in which the frequency of a signal (chirp) varies linearly over time in a bandwidth of Fs Hz. A chirp having a positive gradient in the frequency-time plane is generally referred to as an up-chirp, for example chirp 1 and chirp 2 on FIG. 1. A chirp having a negative gradient in the frequency-time plane is generally referred to as a down-chirp, for example chirp 3 on FIG. 1.

A chirp can be represented by a sequence of N samples. One or more identical contiguous chirps can form a symbol that represents a data value to be communicated. A chirp can be represented mathematically as:

$$C(g,p)=e^{j\pi g(n-fn(p))(n+1-fn(p))/N} \qquad \text{(equation 1)}$$

where g is the gradient of the chirp, N is the number of samples in the sequence, n is a sample in the sequence, p is the symbol's value, fn(p) is a function that encodes p onto the received chirp, which implicitly may also be a function of g, n, N and other constants, and C is the received chirp sequence, which is normally evaluated for all integer values of n from 0 to N−1 in order. The number of valid values of p is the symbol set size, which is nominally N. However, the symbol set size can be more or less than N depending on the quality of the link. The value of g can have any value greater than 0 and less than N. Preferably, g is an integer between 1 and N−1. Due to the modular nature of this expression negative gradients are obtained from N−1 backwards. Hence, N−2 is equivalent to a negative gradient of −2. Where there are more than one identical contiguous chirps in a symbol, each chirp individually conveys the same value which is the symbol value of the symbol.

Figure 1:
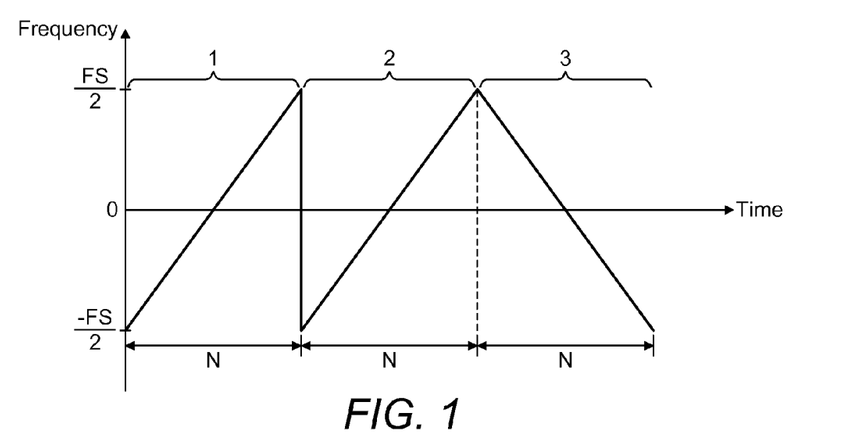
FIG. 1 illustrates a sequence of chirps in the frequency-time plane.

Chirp 1 in FIG. 1 has a starting frequency of −Fs/2 and a gradient of 1. It increases linearly in frequency over a period of N samples at a sample rate of Fs to reach a frequency close to +Fs/2. Since this is a complex sampled system +Fs/2 is the same as −Fs/2. Multiple chirps are usually contiguous but may start with a different frequency. The signal phase is typically made continuous throughout a sequence of chirps. In other words, after the signal has reached +Fs/2 at n=N−1, the next symbol starts with n=0 again. FIG. 1 illustrates an example in which two consecutive chirps have the same symbol value, whereas the third chirp is different. An apparent discontinuity in frequency between chirp 1 and chirp 2 occurs at n=N.

Figure 2:
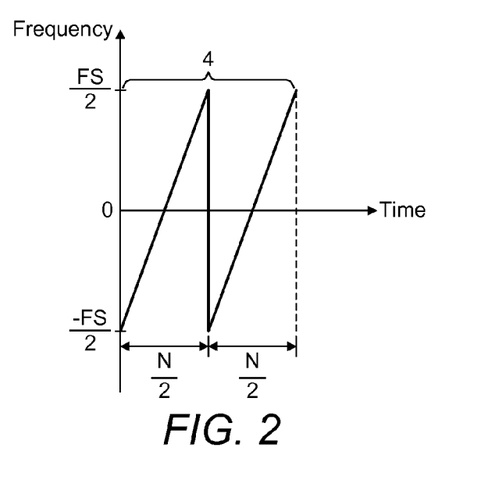
FIG. 2 illustrates a chirp having a gradient of 2 in the frequency-time plane.

Chirp 4 in FIG. 2 has a gradient of 2 and a starting frequency of −Fs/2. Because it has double the gradient of the chirps of FIG. 1, it increases linearly in frequency to +Fs/2 in half the number of samples that the chirps in FIG. 1 do, i.e. it reaches close to +Fs/2 after close to N/2 samples. The chirp then wraps around in frequency. Since this is a sampled system, these frequency wraps are in effect continuous and have continuous phase. The chirp repeats the frequency sweep from −Fs/2 to +Fs/2 between samples N/2 and N.

The chirps also have continuous frequency and phase from one end of the chirp to the other. A cyclic shift of the samples that make up a chirp creates another valid chirp.

Chirp communications are typically used in systems operating using low data rates and short messages. In such systems, the transmitter typically transmits messages periodically, for example a remote temperature tag may periodically transmit a message indicating a measured temperature. Typically, the transmitter does not know the location of the receiver or receivers which are to receive the message it transmits. Reliable receipt of the transmission at distal receivers as well as close by receivers is desirable. One solution is to transmit the messages with sufficiently high power to be detectable by all receivers within a predetermined range. However, chirps signals are typically communicated between low power devices, for example battery powered handheld devices and in environments where there could be multiple simultaneous transmitting devices. Transmission of frequent high power signals causes an undesirable drain on the power reserves of a battery powered device, and also causes undesirable interference to other users of the system.

Rather than transmitting at a high power, another solution to enable reliable receipt of the transmission at a distal receiver is to increase the sensitivity of the receiver by adding error correction bits, for example forward error correction (FEC). However, FEC requires the transmission of additional bits, which incurs additional delay and requires more energy. FEC is suitable for higher value communications systems where large numbers of silicon gates are acceptable. Chirp communications allow for low power and small silicon area solutions and are targeted at very high volume and very lost cost markets. Hence, additional gates for FEC circuitry, in both the transmitter and receiver, are proportionally expensive and power hungry.

Thus, there is a need for an improved method of communicating a chirp signal from a transmitter to a receiver that increases the receiver sensitivity, but that is suitable for a communication system operating using small silicon areas, low power and short messages and in environments where there could be multiple simultaneous transmitting devices.

SUMMARY OF THE INVENTION

According to a first aspect, there is provided a method for receiving a chirp signal at a receiver, the chirp signal communicated over a link from a transmitter, the chirp signal comprising at least one symbol, each symbol comprising a plurality of identical chirps, each chirp encoding a symbol value, the method comprising: determining a measure indicative of error in the received chirp signal; determining the number of coherent integrations and non-coherent integrations to apply per symbol in dependence on the indicated error; for each symbol, coherently and non-coherently integrating the plurality of chirps in accordance with the determined numbers so as to form an integrated symbol; and for each symbol, decoding the symbol value from the integrated symbol.

Suitably, the measure indicative of error in the received chirp signal is a quality of the link. Alternatively, the measure indicative of error in the received chirp signal is a drift between the receiver and transmitter.

Suitably, the method comprises determining the number of coherent integrations and non-coherent integrations to apply per symbol such that the number of chirps per coherent integration increases if the link quality is below a threshold.

Suitably, the method comprises determining the number of coherent integrations and non-coherent integrations to apply per symbol such that the number of non-coherent integrations increases if the drift is above a threshold.

Suitably, each symbol consists of R chirps, sets of Nc chirps are coherently integrated per symbol, and there are Nn non-coherent integrations per symbol, where Suitably, the method further comprises: determining a drift between the receiver and transmitter; and only determining the number of coherent integrations and non-coherent integrations to apply per symbol in dependence on the link quality if the drift is below a threshold.

Suitably, the method further comprises: determining a quality of the link between the receiver and transmitter; and only determining the number of coherent integrations and non-coherent integrations to apply per symbol in dependence on the drift if the link quality is above a threshold.

Suitably, determining the drift comprises determining a frequency drift between the receiver and the transmitter.

Suitably, determining the frequency drift is performed by multiplying each received chirp with a plurality of generated chirps, each generated chirp occupying a frequency band offset from the other generated chirps, and analysing the correlation peaks so as to determine the frequency band occupied by the received chirp.

Suitably, determining the drift comprises determining a timing drift between the receiver and the transmitter.

Suitably, the method comprises determining the timing drift by sampling each received chirp at a plurality of time periods offset from each other, and correlating each sampled chirp with a generated chirp, and analysing the correlation peaks so as to determine the time period occupied by the received chirp.

Suitably, the link quality is determined by measuring a signal to noise ratio of the link.

Suitably, the link quality is determined by measuring an error rate of the link.

Suitably the method comprises, for each symbol, coherently integrating sets of Nc chirps and one set of $$R - \left\lfloor \frac{R}{Nc} \right\rfloor Nc$$

chirps to form a resultant chirp per set, and non-coherently integrating the resultant chirps so as to form the integrated symbol.

According to a second aspect, there is provided a receiver for receiving a chirp signal communicated over a link from a transmitter, the chirp signal comprising at least one symbol, each symbol comprising a plurality of identical chirps, each chirp encoding a symbol value, the receiver comprising: a processor configured to determine a measure indicative of error in the received chirp signal, the processor further configured to determine the number of coherent integration and non-coherent integrations to apply per symbol in dependence on the indicated error; an integrator configured to, for each symbol, coherently and non-coherently integrate the plurality of chirps in accordance with the determined numbers so as to form an integrated symbol; and a decoder configured to, for each symbol, decode the symbol value from the integrated symbol.

Suitably, the processor is configured to determine the number of coherent integrations and non-coherent integrations to apply per symbol such that the number of chirps per coherent integration increases if the link quality is below a threshold.

Suitably, the processor is configured to determine the number of coherent integrations and non-coherent integrations to apply per symbol such that the number of non-coherent integrations increases if the drift is above a threshold.

Suitably, the processor is further configured to determine a drift between the receiver and transmitter, and only determine the number of coherent integrations and non-coherent integrations to apply per symbol in dependence on the link quality if the drift is below a threshold.

Suitably, the processor is further configured to determine a quality of the link between the receiver and transmitter, and only determine the number of coherent integrations and non-coherent integrations to apply per symbol in dependence on the drift if the link quality is above a threshold.

Suitably, the processor is configured to determine the drift by determining a frequency drift between the receiver and the transmitter.

Suitably, the processor is configured to determine the frequency drift by multiplying each received chirp with a plurality of generated chirps, each generated chirp occupying a frequency band offset from the other generated chirps, and analyse the correlation peaks so as to determine the frequency band occupied by the received chirp.

Suitably, the processor is configured to determine the drift by determining a timing drift between the receiver and the transmitter.

Suitably, the processor is configured to determine the timing drift by sampling each received chirp at a plurality of time periods offset from each other, and correlate each sampled chirp with a generated chirp, and analyse the correlation peaks so as to determine the time period occupied by the received chirp.

Suitably, the processor is configured to determine the link quality by measuring a signal to noise ratio of the link.

Suitably, the processor is configured to determine the link quality by measuring an error rate of the link.

Suitably, the integrator is configured to, for each symbol, coherently integrate sets of Nc chirps and one set of $$R - \left\lfloor \frac{R}{Nc} \right\rfloor Nc$$

chirps to form a resultant chirp per set, and non-coherently integrate the resultant chirps so as to form the integrated symbol.

BRIEF DESCRIPTION OF THE DRAWINGS

The following disclosure will now be described by way of example with reference to the accompanying drawings. In the drawings.

DETAILED DESCRIPTION

The following disclosure is directed at a method of receiving a chirp signal at a receiver which increases the sensitivity of the receiver to the chirp signal. The receiver achieves this by determining the manner in which it integrates the chirps of the received chirp signal in dependence on a measure indicative of error in the received chirp signal. This error may have been introduced by means of imperfections of the link between the transmitter and the receiver. For example, the measure indicative of error may be a measure of the link quality between the transmitter and the receiver, for example bit error rate (BER) or signal to noise ratio (SNR). Alternatively, the error may have been introduced by means of imperfections at the transmitter or the receiver. For example, the measure indicative of error may be a measure of the drift between the transmitter's crystal and the receiver's crystal. In particular, the receiver determines the number of coherent and non-coherent integrations to perform per symbol of the chirp signal in dependence on these factors. This process will be described further in the examples that follow.

As previously described, a chirp in the chirp signal can be represented by a sequence of N samples. One or more identical contiguous chirps can form a symbol that represents a data value to be communicated. Mathematically, a chirp signal can be represented as:

$$C(g,p) = e^{j\pi g(n-fn(p))(n+1-fn(p))/N} \quad \text{(equation 1)}$$

where g is the gradient of the chirp, N is the number of samples in the sequence, n is a sample in the sequence, p is the symbol's value, fn(p) is a function that encodes p onto the received chirp, which implicitly may also be a function of g, n, N and other constants, and C is the received chirp sequence, which is normally evaluated for all integer values of n from 0 to N−1 in order. The number of valid values of p is the symbol set size, which is nominally N. However, the symbol set size can be more or less than N depending on the quality of the link. The value of g can have any value greater than 0 and less than N. Preferably, g is an integer between 1 and N−1. Due to the modular nature of this expression negative gradients are obtained from N−1 backwards. Hence, N−2 is equivalent to a negative gradient of −2. Where there are more than one identical contiguous chirps in a symbol, each chirp individually conveys the same value which is the symbol value of the symbol.

Chirps have several properties which are configurable by a transmitter. One such property is the symbol value p. The N samples of a chirp are cyclically shiftable. For example, the particular cyclically shifted position of the samples in a chirp relative to a default position can be used to define the symbol value. In other words the cyclic phase of the N samples of a chirp can be related to the symbol value. There are N different cyclic phases of a chirp, and hence, in this example, there are N different possible symbol values. Suitably, the symbol value p is used to convey data. The amount of data that is conveyed by the symbol value of one symbol depends on the value of N. For example, if N is 257 then there are 257 different possible symbol values. Consequently, the detected symbol value could be used to convey approximately 8 bits of data. For example, if p is 10 then this could be interpreted as the 8 bits 00001010. Similarly, if p is 40 then this could be interpreted as the 8 bits 00101000. Further bits can be encoded by whether the chirp is an up-chirp or a down-chirp.

Figure 3:
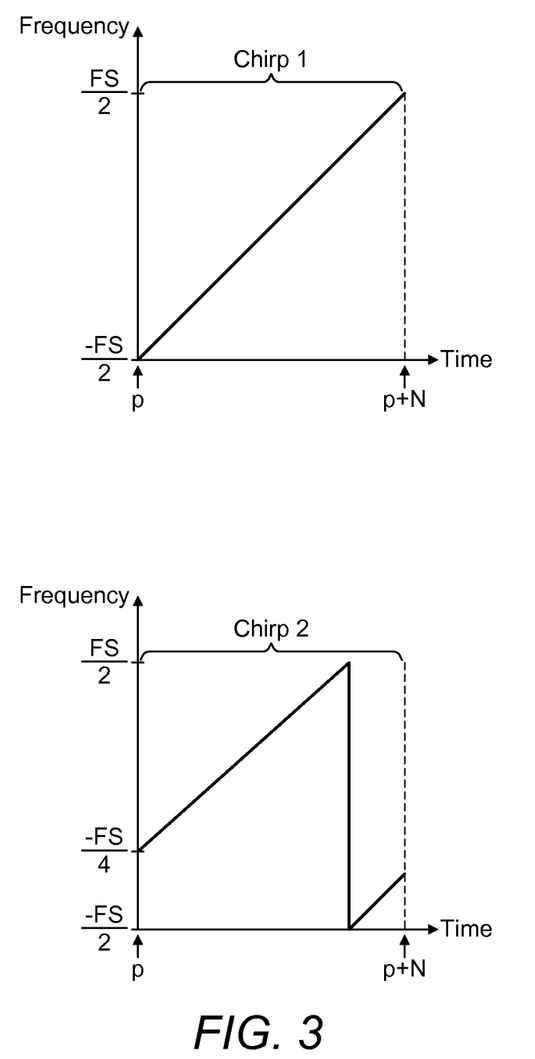
FIG. 3 illustrates encoding data via the starting frequency of a chirp.

Suitably, the symbol value is controlled by controlling the starting frequency of each chirp in the symbol. Alternatively, this is achieved by evaluating equation 1 using the selected p values. FIG. 3 illustrates the concept of using the symbol value p to convey data by showing two chirps both having unity gradient. Chirp 1 has a starting frequency of −Fs/2. The symbol value p of chirp 1 is such that the chirp increases in frequency to +Fs/2 over N samples. Chirp 2 has a starting frequency of −Fs/4. The symbol value p of chirp 2 is such that the chirp increases in frequency to +Fs/2 in less than N samples and then drops down to −Fs/2 and returns to −Fs/4 after N samples. Suitably, the chirp receiver detects the symbol value of each chirp in the chirp signal in order to decode the data in the chirp signal.

Figure 4:
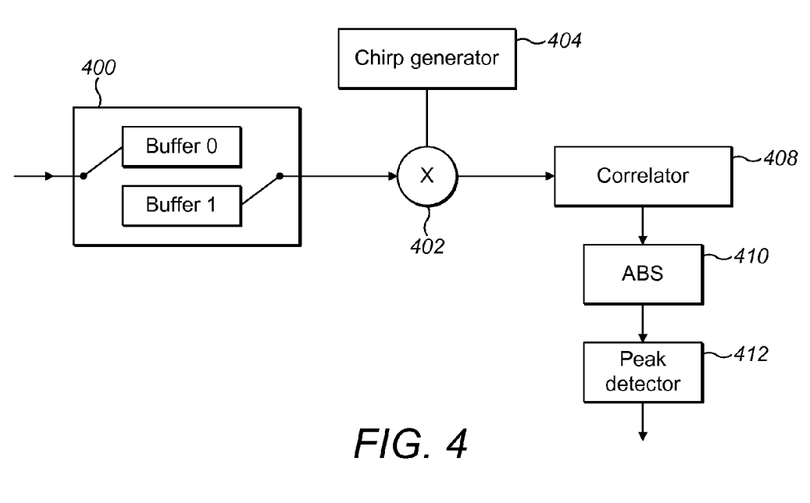
FIG. 4 illustrates a schematic diagram of the exemplary components of a chirp receiver.

Reference is now made to FIG. 4 which is a schematic diagram of the exemplary components of a general chirp receiver.

A chirp signal is received at the chirp receiver and the samples of a received chirp of the chirp signal are input to buffer module 400. Suitably, buffer module 400 comprises two buffers. This enables an input buffer to be receiving samples whilst the output buffer is being read. When the input buffer becomes full the two buffers are swapped over so that input samples can continue to be sampled and stored without loss. If one of a set of chirp gradients are expected, for example when decoding additional symbol bits by using 2^K gradients to represent K bits of additional information, or when wanting to communicate with one of a number of devices with different predefined gradients, then the output buffer may be read multiple times, once for each possible gradient. With suitably fast digital processing clock rates these buffers can provide a means to decode and track received chirps in real time. The received chirp samples output from the buffer module 400 are input to chirp multiplier 402.

Chirp generator 404 generates a reference chirp which has a gradient g' which differs from the gradient g of the chirp output from the buffer module 400 by a fixed value v. Preferably, this fixed value is 1. Preferably, g−g'=1. Preferably, the reference chirp has the same number of samples in a chirp N, sample rate (bandwidth) and centre frequency as the chirp output from the buffer module 400. Suitably, the receiver operates according to a protocol in which the gradient, the sample rate, the number of repeats of a chirp in a symbol, the number of samples N in a chirp, and the frequency hopping sequence of each symbol in the chirp signal are known by the receiver in advance of receiving the chirp signal. These properties may be defined by the protocol. In a public broadcast system these properties may be publicly known. Alternatively, one or more of these properties may be negotiated between the transmitter and the receiver in advance of communication of the chirp signal.

Suitably, the chirp multiplier 402 multiplies the received chirp with the conjugate of the reference chirp generated by chirp generator 404. The mixed chirp output from the chirp multiplier 402 is input to correlator 408.

Figure 5:
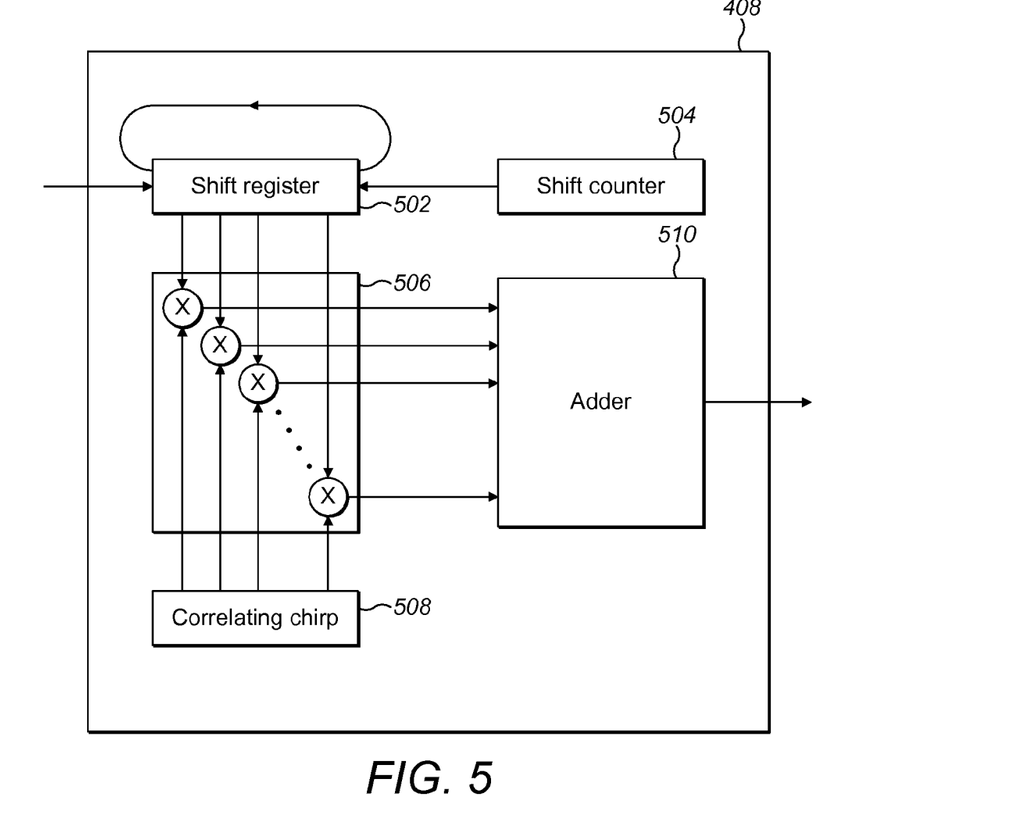
FIG. 5 illustrates a schematic diagram of a chirp correlator

The correlator 408 correlates the mixed chirp with a conjugate of the fixed correlating chirp. The fixed correlating chirp has a gradient which is equal to the fixed value v. Preferably, the fixed correlating chirp has unity gradient. FIG. 5 illustrates a more detailed diagram of an exemplary correlator 408. The N samples of the mixed chirp signal output from chirp multiplier 402 are first loaded into N-stage circular shift register 502. The fixed gradient correlating chirp signal consists of one chirp of N samples which are preloaded into correlating chirp module 508. The shift counter 504 is preloaded with the number of shifts, and hence the number of outputs of correlator 408. During normal operation shift counter 504 is preloaded with N, but when using reduced symbol alphabets or if N is non-prime then shift counter 504 could be less than N. The correlator 408 comprises N complex multipliers 506, each taking a complex input from the N-stage circular shift register 502 samples, and the corresponding complex input from the correlating chirp module 508. The output from the N complex multipliers is then summed at adder 510 to yield a single complex correlator sample that is output from the correlator 408. For each successive correlation, the N-stage circular shift register 502 rotates by one. If the sample at the beginning of the N-stage circular shift register is s for one correlation, then the sample at the beginning of the N-stage circular register is s-1 for the next correlation. In this way, the correlator performs a correlation between the fixed gradient correlating chirp and N cyclic phases of the mixed chirp, generating N outputs. When the received chirp, the reference chirp and fixed correlating chirp have gradients such that $g-g \ne v$, then the correlator outputs small values for all cyclic phases. This is the case when the chirp receiver is not configured to correctly receive the chirp signal. When the received chirp, the reference chirp and fixed correlating chirp have gradients such that $g-g'=v$, the correlator outputs a strong correlation peak when the cyclic phase of the mixed chirp matches that of the fixed gradient correlating chirp and smaller values in other positions.

Suitably, the output of the correlator 408 is input to an absolute value module 410. The absolute value module returns the magnitude of the complex input signal from the correlator 408. Peak detection module 412 then detects the position of the correlation peak. The position of the correlation peak identifies the symbol value of the chirp. The data encoded in the chirp is then determined from the symbol value of the chirp.

A receiver according to the methods described herein receives a chirp signal which comprises symbols, each symbol including R identical chirps. Each chirp of the symbol encodes the same value which is the symbol value of the symbol. Transmitters which format chirp signals such that chirps are repeated in this manner increase the likelihood that distal receivers accurately receive both the chirp signal and the data it contains. This is because the distal receivers are able to integrate the plurality of chirps of the symbol in order to detect the symbol value. The receiver may coherently integrate the chirps, non-coherently integrate the chirps, or perform a mixture of coherent and non-coherent integration.

Figure 6:
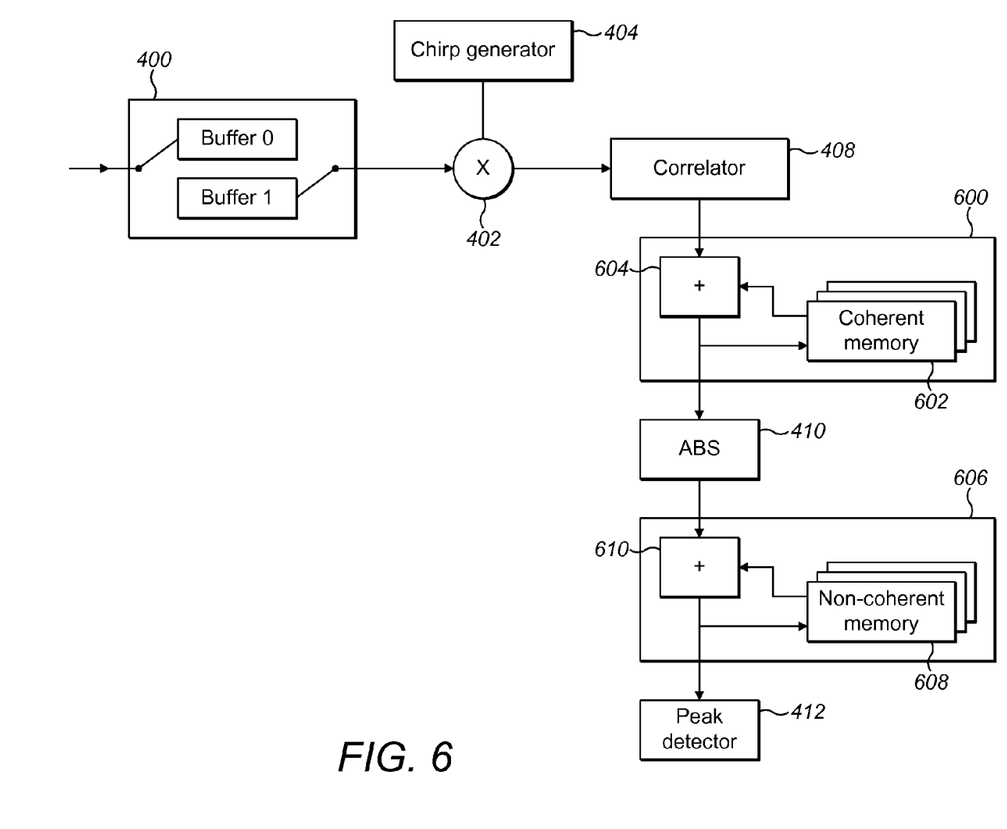
FIG. 6 illustrates a schematic diagram of the exemplary components of a chirp receiver including integrators.

FIG. 6 illustrates a schematic diagram of the exemplary components of a chirp receiver which performs both coherent integration and non-coherent integration. Those components of FIG. 6 that are the same as those of FIG. 4 operate as already described with reference to FIG. 4.

The output from the correlator 408 is input to coherent integrator 600. Coherent integrator 600 comprises adder 604 and coherent memory 602. Coherent memory 602 accumulates sets of Nc complex chirps output from the correlator 408. Each set of chirps may be some or all of the chirps in a symbol, i.e. Nc≤R. All of the chirps in a set nominally have the same symbol value.

The coherent integrator is configured to integrate corresponding correlator outputs of each of the chirps in a set. So, for example, the coherent integrator integrates the correlator output of each chirp for the case when the N-stage circular shift register is in the position s=1. Similarly, the coherent integrator integrates the correlator output of each chirp for the case when the N-stage circular shift register is in the position s=2, and so on. The coherent integrator performs the integration by storing the N samples of the correlator output for a specific s position of the first chirp in the set in the memory 602. It then retrieves these stored N samples from memory 602 and performs an average of them with the N samples of the corresponding correlator output of the second chirp in the set. It then stores this averaged output in the memory 602. It then retrieves these stored N samples from memory 602 and performs an average of them with the N samples of the corresponding correlator output from the third chirp in the set. The iteration continues until all the chirps in the chirp set have been integrated.

Alternatively, all the samples from repeated chirps are stored in memory 602 before an average is performed. Alternatively, if memory 602 is limited the coherent integrator performs the average using N IIR (infinite impulse response) filters, with coefficients suitably chosen for the number of identical chirps in the set. The coherent integrator 600 thereby generates N outputs, each output being the integration of the Nc chirps correlated with the same circular shift position.

Each output is scaled by a constant in order to normalise its data magnitude. The N outputs for each set of Nc chirps will be collectively called a resultant chirp herein. The coherent integrator 600 outputs a resultant chirp for each set of Nc chirps in the symbol. There are $$Nn = \left\lceil \frac{R}{N_c} \right\rceil$$

sets per symbol consisting of R chirps, and hence $$Nn = \left\lceil \frac{R}{N_c} \right\rceil$$

resultant chirps per symbol consisting of R chirps.

The absolute value of each of the N outputs of the resultant chirp is then determined in absolute value module 410.

The output of the absolute value module 410 is input into the non-coherent integrator 606. Non-coherent integrator 606 comprises adder 610 and non-coherent memory 608. Non-coherent integrator 606 accumulates the magnitudes of the Nn resultant chirps of the set output by the coherent integrator 600.

The non-coherent integrator is configured to integrate corresponding outputs of each of the Nn resultant chirps output by the coherent integrator 600. So, for example, the non-coherent integrator integrates the output of each of the Nn resultant chirps for the case when the N-stage circular shift register is in the position s=1. Similarly, the integrator integrates the Nn resultant chirps for the case when the N-stage circular shift register is in the position s=2, and so on.

The non-coherent integrator 606 performs the integration by storing the N samples of the first of the Nn resultant chirps for a specific s position in the memory 608. It then retrieves these stored samples from memory 608 and performs an average of them with the N samples of the corresponding output of the second of the Nn resultant chirps in the set. It then stores this averaged output in the memory 608. The iteration continues until all Nn resultant chirps have been integrated to form an integrated symbol.

In one approach all the samples from repeated chirps are stored in memory 608, before an average is performed. Alternatively, if memory 608 is limited the integrator might perform the average using N IIR (infinite impulse response) filters, with coefficients suitably chosen for the number of identical chirps.

The peak detection module 412 then analyses the integrated symbol in order to determine which of the N-stage circular shift register positions results in the highest correlation peak. This indicates the symbol value encoded in the symbol.

In the described chirp signal, there are R identical chirps in a symbol. Sets of Nc chirps are coherently integrated per symbol. Suitably Nc is a factor of R. In this case each set of chirps that is coherently integrated per symbol has Nc chirps, and:

$$R = NnNc \quad \text{(equation 2)}$$

Alternatively, Nc is any positive integer less than R. In this case, there are $$\left\lceil \frac{R}{N_c} \right\rceil$$

sets of chirps per symbol.

$$\left\lceil \frac{R}{N_c} \right\rceil - 1$$

of these sets each consist of Nc chirps. One set consists of $$R - \left\lfloor \frac{R}{Nc} \right\rfloor Nc$$

chirps. In this case:

$$R = Nc(Nn-1) + Nrem \quad \text{(equation 3)}$$

where Nrem is the number of chirps in the set of chirps which has fewer than Nc chirps.

Figure 7:
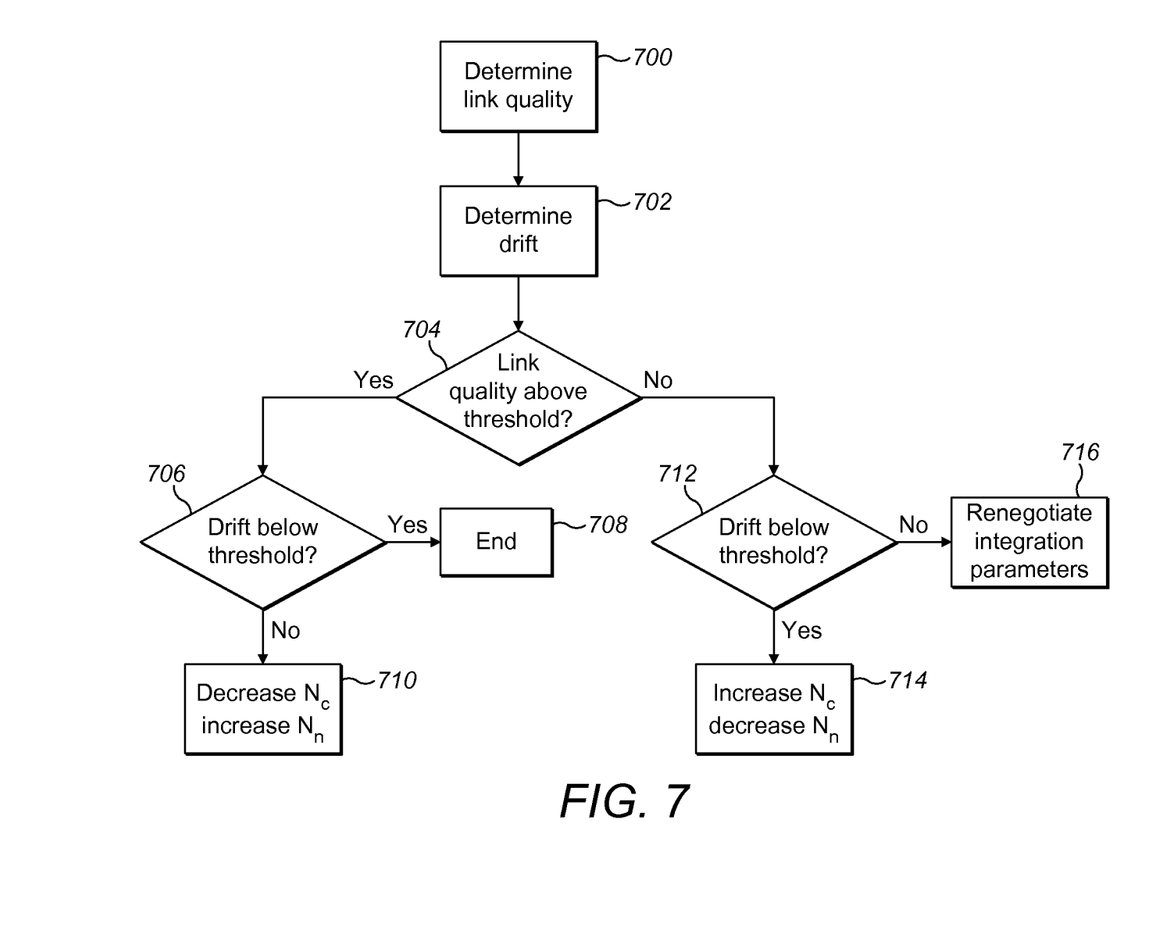
FIG. 7 is a flow chart illustrating an integration method.

Reference is now made to FIG. 7, which illustrates a method of determining the integration parameters to use in coherently and non-coherently integrating the correlator output of a received chirp signal. At step 700 the quality of the link between the transmitter and the receiver is determined. The link quality may be any suitable parameter that is a measure of the quality of the link. Examples include signal to noise ratio (SNR) and error rate such as bit error rate (BER). At step 702, the receiver determines the drift between the transmitter's crystal and receiver's crystal. Suitably, the drift is the frequency drift between the transmitter and receiver. Alternatively, this drift is the timing drift between the transmitter and receiver. Alternatively, this drift is a measure of both the frequency drift and the timing drift between the transmitter and the receiver.

At step 704, the receiver determines whether the link quality is above a threshold. If the link quality is above the threshold, the receiver determines at step 706 if the drift is below a threshold. If the drift is below a threshold value (step 706) then the receiver determines that the current integration parameters can be maintained (step 708). For example, the receiver determines that Nn and Nc used for the last integration are to be used for the next integration. Alternatively, if the link quality is exceptionally good, the receiver may decide to renegotiate the integration parameters to minimise interference to other users. If the drift is not below a threshold value (step 706) then the receiver determines to change the current integration parameters. Preferably, if the link quality is above the threshold, then the receiver only determines to change the current integration parameters if the frequency drift is not below the threshold in step 706. For example, the receiver determines to decrease Nc which is the number of chirps in each set of chirps which are coherently integrated together (step 710). Suitably, the number of non-coherent integrations Nn is increased subject to the total number of chirps R (see equations 2 and 3 above). Typically, the reduction in the proportion of coherent integrations reduces the observed frequency drift between the transmitter and receiver.

If, at step 704, the link quality is not above the threshold, the receiver determines at step 712 if the drift is below a threshold. If the drift is below a threshold value (step 712), then the receiver determines to change the current integration parameters. Preferably, if the link quality is below the threshold in step 704, then the receiver only determines to change the current integration parameters internally if the drift is below the threshold in step 712. For example, the receiver determines to increase the number of chirps in each set of chirps which are coherently integrated together Nc. The number of non-coherent integrations Nn is reduced subject to the total number of chirps R. Typically, the increase in the proportion of coherent integrations has the effect of increasing the sensitivity of the receiver, which increases the link quality. If, at step 712, the drift is determined to not be below the threshold, then the receiver determines to renegotiate the integration parameters being used with the transmitter. Preferably, if the link quality is determined to not be above the threshold at step 704, then the receiver determines to renegotiate the integration parameters with the transmitter only if the drift is not below the threshold of step 712.

The steps in FIG. 7 may be performed in a different order. For example, the drift can be determined prior to determination of the link quality. Alternatively, the link quality may be determined prior to determination of the drift. Alternatively, both the link quality and drift may be determined contemporaneously. Similarly, the comparison of the drift to the drift threshold can be determined prior to comparison of the link quality to the link quality threshold. Alternatively, the comparison of the link quality to the link quality threshold can be determined prior to comparison of the drift to the drift threshold. Alternatively, both the comparisons may be carried out contemporaneously. The determination of the number of coherent and non-coherent integrations to apply per symbol may be made solely in dependence on the comparison of the link quality to its threshold. The determination of the number of coherent and non-coherent integrations to apply per symbol may be made solely in dependence on the comparison of the drift to its threshold.

Suitably, if, following step 706, the receiver determines to decrease the number of chirps per coherent integration and increase the number of non-coherent integrations, but the receiver is unable to change the values of Nc and Nn to the determined values, then the receiver determines to renegotiate the integration parameters with the transmitter. The receiver may be unable to change the value of Nc, for example, because Nc is already at its minimum value.

Suitably, if, following step 714, the receiver determines to increase the number of chirps per coherent integration and decrease the number of non-coherent integrations, but the receiver is unable to change the values of Nc and Nn to the determined values, then the receiver determines to renegotiate the integration parameters with the transmitter. The receiver may be unable to change the value of Nc, for example, because Nc is already at its maximum value.

If the quality of the link is poor then an increase in performance may be achieved by increasing the number of chirps which are coherently integrated together per coherent integration. Because the chirps in a symbol are identical, by integrating more identical chirps together the received signal strength is higher, and therefore the received data is more accurately distinguishable over the background noise. However, if the timing or frequency drift between the transmitter's crystal and the receiver's crystal is too large, then the chirps will not be properly integrated at the receiver, in which case increasing the level of coherent integration will not increase performance. If the link quality is low and the drift is too high, the receiver renegotiates integration parameters with the transmitter in order to increase the link quality and/or drift between the transmitter and receiver.

If the quality of the link is high but the drift between the transmitter and the receiver is also high, then an increase in performance is achievable by decreasing the number of chirps which are coherently integrated together per coherent integration. This is because, if the drift is high, then timing or frequency is lost over the course of the coherent integration which will result in the chirps not being properly integrated. The drift over the course of the integration is minimised by reducing the time of the integration, i.e. by reducing the number of chirps per coherent integration.

Suitably, the receiver uses the method described in the flow chart of FIG. 7 in order to select the number of coherent integrations and the number of non-coherent integrations to apply per symbol in order to increase the likelihood that the resultant integrated symbol is decoded to produce the symbol value that it was encoded with at the transmitter.

The coherent gain in dB is:

$$G_c = 10\log_{10}\left(\frac{T}{T_0}\right) \quad \text{(equation 4)}$$

where T is the length of a symbol in seconds, and $T_0$ is the reference period for gain calculation which is 1 µs.

The non-coherent gain in dB can be approximated by:

$$G_n \cong 2.2\log_2\left(\frac{T}{T_0}\right) \quad \text{(equation 5)}$$

where T is the length of a symbol in seconds, and $T_0$ is the reference period for gain calculation which is 1 µs.

The magnitude of the coherent integration for a rotating input signal with length $T_c$ is:

$$M_c = \left|\int_0^{T_c} me^{jt\varphi}\,dt\right| = \left|\frac{m}{j\varphi}e^{jT_c\varphi} - 1\right| \quad \text{(equation 6)}$$

where $T_c$ is the optimal coherent integration period in seconds, and $\varphi$ is the rotation rate of the input signal with respect to the local clock in radians per second.

By combining coherent and non-coherent integration, an approximate expression for the overall gain can be created and maximised for $T_c$:

$$\text{argmax}_{T_c}\left[2.2\log_2\left(\frac{T}{T_c}\right) + 10\log_{10}\left(\left|\frac{m}{j\varphi}[e^{jT_c\varphi} - 1]\right|\right)\right]$$

From which, $$T_c \cong \frac{2\pi}{3.6\varphi} \quad \text{(equation 7)}$$

The methods described herein may use these equations to determine the optimal coherent integration time period $T_c$. The coherent integration time period determines the number of coherently integrated chirps Nc in each set of the symbol, and hence the number of non-coherent integrations.

The peak detector 412 is suitably configured to measure one or more parameters. Suitably, the peak detector uses current and historical peak positions to measure the parameters. The peak detector may also use raw data to measure the parameters. The peak detector suitably includes a memory in which it stores previous peak positions.

One parameter that the peak detector is suitably configured to measure is the quality of the link between the transmitter and the receiver. For example, the peak detector may be configured to measure the signal to noise ratio (SNR). The peak detector may measure the SNR by dividing the peak amplitude by the root mean square of the remaining samples excluding outliers. Suitably, the result is then normalised to provide the SNR.

Suitably, the chirp signal in buffer 400 is read a plurality of times with different settings. For example, in order to determine the timing drift between the transmitter and the receiver, the chirp signal is suitably sampled a plurality of times. The chirp signal is sampled at a nominal time period which is that that the receiver considers to be the time period occupied by a received chirp. In the following, this signal is called the prompt signal. Suitably, the chirp signal is sampled at further time periods, each offset from the others. For example, suitably the chirp signal is sampled earlier and later than the nominal time period. For example, the earlier signal may be sampled about ⅓ of a sample earlier than the prompt signal, and the later signal may be sampled about ⅓ of a sample later than the prompt signal. Further subdivisions of the chirp signal may be made to increase the accuracy of the timing measurement. Each sampled chirp is correlated with a generated chirp as described with reference to FIGS. 4 and 5. The peak detector analyses the correlation peaks of the differently sampled chirps. The position of the highest peak from all differently sampled chirps indicates the integer and fractional time offset. For example, if the early signal (described above) has a larger peak than the prompt or late signals then the peak detector determines that the time offset is −⅓ of a sample. The position of the peak relative to its expected position is the integer offset scaled by g and modulo N. Typically, in a synchronised receiver, the integer offset is zero. An estimate of the time period of the received chirp compared to the nominal time period of the receiver provides a measure of the timing drift of the transmitter's and receiver's crystals. Suitably, the peak detector interpolates the peak magnitude and sample magnitudes, g samples either side of the largest peak, in order to provide a more accurate estimate of the timing drift. If repeated over time, a rate of change of the timing drift can be determined.

In order to determine the frequency drift between the transmitter and the receiver, the chirp signal is read from buffer 400 a plurality of times. Each time the signal is read it is correlated against a different reference chirp generated by chirp generator 404 as described with reference to FIG. 4. Each of these generated chirps has a frequency band offset from the other generated chirps. Typically, these frequency bands are overlapping. Suitably, the generated chirps are generated at the nominal frequency band that the receiver expects the received chirp to occupy, and at a higher and lower frequency band to the nominal frequency band. The first time a chirp is read it is multiplied in the chirp multiplier 402 by a first one of the generated chirps. The second time the chirp is read it is multiplied in the chirp multiplier 402 by a second one of the generated chirps, and so on. The peak detector selects the frequency band that produces the largest overall peak from correlator 408 when mixed with all generated chirps. Further accuracy is achieved by using more overlapping frequency bands. An estimate of the frequency band occupied by the received chirp compared to the nominal frequency band of the receiver provides a measure of the frequency drift between the transmitter's and receiver's crystals. Suitably, the peak detector interpolates the sample magnitudes either side of the largest overall peak in order to provide a more accurate estimate of the frequency drift. If repeated over time, a rate of change of the frequency drift can be determined.

Alternatively, rather than reading a fixed chirp signal from the buffer and mixing against different reference signals, an additional mixer device is used to change the frequency of the chirp signal read from the buffer. In this case a single fixed reference signal is input into chirp multiplier 402 as well as the frequency adjusted chirp signal. The correlation and peak detection remains the same as in the first proposal.

The values of Nn and Nc can be inferred from the measurements of link quality, frequency drift and timing drift as described with reference to FIG. 7.

Another measure of link quality is the error rate of the link, for example bit error rate. Suitably, bit error rate is determined by the chirp receiver by analysing error correction bits added to the chirp signal.

In an alternative arrangement, the values of Nn and Nc are experimentally determined. In this case, the complex correlator data of all R chirps of each symbol of a chirp signal are stored in memory. A plurality of different combinations of Nn and Nc are then applied to the results stored in the memory. For each combination, following integration, an SNR estimate is made by the peak detector. Suitably, the SNR estimate is made in accordance with the method previously described. The chirp receiver then selects the Nn and Nc combination that yielded the highest SNR estimate. Suitably, selected Nn and Nc combinations for a plurality of symbols are determined and averaged, and then applied to the received chirp signal. The degree of frequency and/or timing drift can also be inferred from the experimentally determined values of Nn and Nc.

The methods described herein increase receiver sensitivity compared to prior art methods due to the dynamic decision of the receiver as to how much coherent and non-coherent integration to perform on the received signal. If the signal is weak (low SNR) but the frequency drift is low, then more coherent integration is applied which increases the receiver sensitivity. This is a method of increasing receiver sensitivity without increasing transmit power, which is thereby suitable for operation on low power devices. If the frequency drift between the transmitter and the receiver has exceeded a threshold, for example because there has been a significant temperature change at either the transmitter, the receiver, or both, then the receiver decreases the coherent integration and increases the non-coherent integration it performs. This receiver based integration strategy does not require the receiver and transmitter to renegotiate integration parameters as frequently as in the prior art. This is desirable for a system operating using low power and short messages at a low data rate. However, if the link quality is low and the drift is high, then the receiver does resort to contacting the transmitter in order to change link parameters. The receiver may not be able to implement changes in Nn and Nc, for example if R is less than the determined Nc. In such cases, the receiver contacts the transmitter in order to change link parameters.

In a specific example, the received chirp signal comprises chirps, wherein each chirp is described by a Zadoff-Chu code. Suitably, contiguous chirp symbols have different Zadoff-Chu codes. Suitably, contiguous chirp symbols also have different centre frequencies. Suitably, the negotiated encryption parameters define the Zadoff-Chu codes sequence of the chirp signal. Suitably, the negotiated encryption parameters also define the frequency hopping sequence of the chirp signal. Using different Zadoff-Chu codes for each symbol provides a degree of coded separation, allowing more than one user to use the frequency spectrum at the same time.

Suitably, the receiver and transmitter described herein are implemented in a system operating according to Bluetooth protocols.

Preferably, the receiver and transmitter described herein are implemented in hardware. Alternatively, the receiver and transmitter described herein may be implemented in software.

Suitably, the receiver and transmitter described herein are implemented in long range radio communications. Typically, chirps are used for implementations that use a low data rate and low power. The receiver and transmitter are suitable for use in high-sensitivity radio communications. Example implementations of the receiver and transmitter are in a temperature sensor, a walkie talkie or a wireless headset.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

What is claimed is:

1. A method for receiving a chirp signal at a receiver, the chirp signal communicated over a link from a transmitter, the chirp signal comprising at least one symbol, each symbol comprising a plurality of identical chirps, each chirp encoding a symbol value, the method comprising:
   determining a quality of the link;
   determining the number of coherent integrations and non-coherent integrations to apply per symbol in dependence on the quality of the link, such that the number of chirps per coherent integration increases if the link quality is below a threshold;
   for each symbol, coherently and non-coherently integrating the plurality of chirps in accordance with the determined numbers so as to form an integrated symbol; and
   for each symbol, decoding the symbol value from the integrated symbol.

2. A method for receiving a chirp signal at a receiver, the chirp signal communicated over a link from a transmitter, the chirp signal comprising at least one symbol, each symbol comprising a plurality of identical chirps, each chirp encoding a symbol value, the method comprising:
   determining a drift between the receiver and transmitter;
   determining the number of coherent integrations and non-coherent integrations to apply per symbol in dependence on the drift between the receiver and transmitter, such that the number of non-coherent integrations increases if the drift is above a threshold;
   for each symbol, coherently and non-coherently integrating the plurality of chirps in accordance with the determined numbers so as to form an integrated symbol; and
   for each symbol, decoding the symbol value from the integrated symbol.

3. A method as claimed in claim 1, further comprising:
   determining a drift between the receiver and transmitter; and only determining the number of coherent integrations and non-coherent integrations to apply per symbol in dependence on the link quality if the drift is below a threshold.

4. A method as claimed in claim 2, further comprising:
determining a quality of the link between the receiver and transmitter; and
only determining the number of coherent integrations and non-coherent integrations to apply per symbol in dependence on the drift if the link quality is above a threshold.

5. A method as claimed in claim 2, wherein determining the drift comprises determining a frequency drift between the receiver and the transmitter.

6. A method as claimed in claim 5, comprising determining the frequency drift by multiplying each received chirp with a plurality of generated chirps, each generated chirp occupying a frequency band offset from the other generated chirps, and analysing the correlation peaks so as to determine the frequency band occupied by the received chirp.

7. A method as claimed in claim 2, wherein determining the drift comprises determining a timing drift between the receiver and the transmitter.

8. A method as claimed in claim 7, comprising determining the timing drift by sampling each received chirp at a plurality of time periods offset from each other, and correlating each sampled chirp with a generated chirp, and analysing the correlation peaks so as to determine the time period occupied by the received chirp.

9. A receiver for receiving a chirp signal communicated over a link from a transmitter, the chirp signal comprising at least one symbol, each symbol comprising a plurality of identical chirps, each chirp encoding a symbol value, the receiver comprising:
a processor configured to determine a quality of the link, the processor further configured to determine the number of coherent integration and non-coherent integrations to apply per symbol in dependence on the quality of the link, such that the number of chirps per coherent integration increases if the link quality is below a threshold;
an integrator configured to, for each symbol, coherently and non-coherently integrate the plurality of chirps in accordance with the determined numbers so as to form an integrated symbol; and
a decoder configured to, for each symbol, decode the symbol value from the integrated symbol.

10. A receiver for receiving a chirp signal communicated over a link from a transmitter, the chirp signal comprising at least one symbol, each symbol comprising a plurality of identical chirps, each chirp encoding a symbol value, the receiver comprising:
a processor configured to determine a drift between the receiver and transmitter, the processor further configured to determine the number of coherent integration and non-coherent integrations to apply per symbol in dependence on the drift between the receiver and transmitter, such that the number of non-coherent integrations increases if the drift is above a threshold;
an integrator configured to, for each symbol, coherently and non-coherently integrate the plurality of chirps in accordance with the determined numbers so as to form an integrated symbol; and
a decoder configured to, for each symbol, decode the symbol value from the integrated symbol.

11. A receiver as claimed in claim 9, wherein the processor is further configured to determine a drift between the receiver and transmitter, and only determine the number of coherent integrations and non-coherent integrations to apply per symbol in dependence on the link quality if the drift is below a threshold.

12. A receiver as claimed in claim 10, wherein the processor is further configured to determine a quality of the link between the receiver and transmitter, and only determine the number of coherent integrations and non-coherent integrations to apply per symbol in dependence on the drift if the link quality is above a threshold.

13. A receiver as claimed in claim 10, wherein the processor is configured to determine the drift by determining a frequency drift between the receiver and the transmitter.

14. A receiver as claimed in claim 13, wherein the processor is configured to determine the frequency drift by multiplying each received chirp with a plurality of generated chirps, each generated chirp occupying a frequency band offset from the other generated chirps, and analyse the correlation peaks so as to determine the frequency band occupied by the received chirp.

* * * * *

UNITED STATES PATENT AND TRADEMARK OFFICE
CERTIFICATE OF CORRECTION

PATENT NO.       : 8,817,843 B2  
APPLICATION NO.  : 13/525244  
DATED            : August 26, 2014  
INVENTOR(S)      : Hiscock Page 1 of 1

It is certified that error appears in the above-identified patent and that said Letters Patent is hereby corrected as shown below:

In the Specification

In Column 1, Line 31, in Equation (1), delete " $C(g,p) = e^{j\pi g(n-fn(p))(n+} 1 - \text{fn}(p))/N$ " and insert -- $C(g,p) = e^{j\pi g(n-fn(p))(n+1-fn(p))/N}$ --, therefor.

In Column 7, Line 15, delete "g-g≠v," and insert -- g-g'≠v, --, therefor.

Signed and Sealed this  
Ninth Day of December, 2014

Michelle K. Lee  
*Deputy Director of the United States Patent and Trademark Office*